** UNITED STATES PATENT OFFICE 2,502,430

PROCESS FOR THE PRODUCTION OF DIENE HYDROCARBONS

John W. Copenhaver and Donald E. Sargent, Easton, Pa., assignors to General Aniline & Film Corporation, New York, N. Y., a corporation of Delaware No Drawing. Application November 15, 1945, Serial No. 628,982

6 Claims. (Cl. 260—681)

The present invention relates to the synthesis of butadiene and other conjugated diene hydrocarbons from monovinyl ethers and related compounds.

The present invention is particularly valuable for the production of butadiene and other conjugated diene hydrocarbons from ethylenically unsaturated ethers of the type represented by the following general formula:

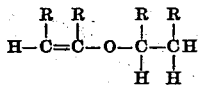

in which at least one of the R's stands for a member of the group consisting of alkyl, aryl and aralkyl radicals, including groups derived by the substitution thereof, and the remaining R's stand for a member of the group consisting of hydrogen, and alkyl, aryl and aralkyl radicals.

While it has heretofore been proposed to prepare butadiene from ethyl vinyl ether by passing the vaporized ether over alumina at 360–460° C., it has heretofore been supposed that this reaction was unique with ethyl ether. We have now discovered, however, that butadiene and other conjugated diene hydrocarbons can be obtained in good yields from other ethylenically unsaturated ethers.

Briefly stated, the present invention comprises heating the vapors of an ethylenically unsaturated ether of the type specified above, to a temperature between 200° C. to 700° C., preferably in the presence of a catalyst known to be effective in dehydration and rearrangement reactions, whereby the ethylenically unsaturated ether undergoes a rearrangement and dehydration and is converted into a conjugated diene hydrocarbon of the type:

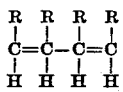

wherein the R's have the meaning specified above.

The ethylenically unsaturated ethers which may readily be converted into conjugated diene hydrocarbons in accordance with the present invention are exemplified by the vinyl, alkylvinyl or arylvinyl ethers of alkyl alcohols; such as vinyl, propenyl, isopropenyl or butenyl ethers of such alkyl alcohols, as propyl, isopropyl, butyl and isobutyl, and higher alkyl alcohols, as lauryl or octadecyl alcohol or montanol, and of such aralkyl alcohols as phenyl-ethyl alcohol, phenyl-propyl alcohol, and phenyl methyl carbinol, also the ethyl ethers of alkyl vinyl alcohols, such as those mentioned above and aryl vinyl alcohols, such as those mentioned below. As examples of aryl vinyl alcohols, which form ethers with alkyl or aralkyl alcohols of the type above-identified, may be mentioned α-phenyl vinyl alcohol and β-phenyl vinyl alcohol. It should also be understood that in place of the vinyl ethers, we may employ substances which are derived therefrom by the addition of groups to the ethylene double bond, which under the conditions of reaction are readily removed so as to again yield the corresponding vinyl ether. Thus, compounds of the type

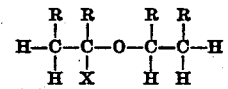

wherein R is defined as above and wherein X represents, for example, alkoxy, aryloxy, aralkoxy, halogen or hydroxy (or an ester thereof, such as, —SO₃H, —OSO₂H, —ONO, —ONO₂, —OCOR, and the like), which may readily be removed together with a hydrogen on the β-carbon atom as HX, so as to produce the corresponding vinyl ether, may be characterized as "potential" vinyl ethers and in the present application are included as the equivalent of vinyl ethers. They may be exemplified by the following compounds: acetals, β-alkoxy butyrals, α-halogenethers, and the like. It should also be understood that mixtures of two or more vinyl ethers, or of vinyl ethers and potential vinyl ethers, may advantageously be treated in accordance with the present invention for the production of diene hydrocarbons.

The exact nature of the reaction which occurs on passing a vaporized ethylenically unsaturated ether of the type specified above over a catalyst at a temperature from 200° C. to 700° C. has not been definitely established. However, it appears that one of the principal reactions occurring is a rearrangement and dehydration of the type outlined in Equation 1 below.

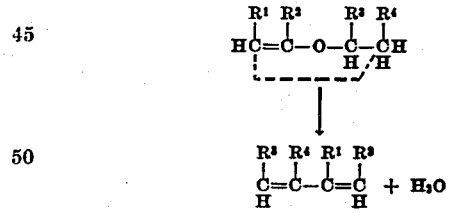

We do not, however, wish to be limited to this theory of operation. It also appears that some cracking occurs, since butadiene has been identified in the products obtained by this reaction from a wide variety of vinyl ethers.

The process of the present invention is catalyzed by a wide variety of catalysts, and any compound known to be active as a catalyst in dehydration or rearrangement reactions is suitable for use in practicing the present invention. Such diverse catalysts as the oxides, sulfides, carbonates, hydroxides, silicates, phosphates, halides, etc., of elements chosen from the group which consists of aluminum, molybdenum, tungsten, thorium, magnesium, calcium, boron, silicon, titanium, vanadium, chromium, manganese, iron, cobalt, nickel, copper, zinc, zirconium, silver, cadmium, etc. In addition, such materials as acidic clays, kieselguhr, glass beads, silica gel, graphite, carbon, Carborundum, pumice, activated charcoal, diatomaceous earth, fuller's earth, etc., have been employed in this conversion. In particular, we have found that good yields are obtained with dehydration catalysts which are solid at the temperature of the reaction or are deposited on solid carriers, and prefer the catalysts which are useful for the production of butadiene from acetaldehyde and ethyl alcohol are operable in our process. Particularly good yields have been obtained with aluminum oxide, 10% tungstic oxide on aluminum oxide, 10% molybdenum sulfide on aluminum oxide, 10% zinc oxide on aluminum oxide, and certain acidic or acid-washed clays. It should be understood that one or more of the above materials may be employed under a variety of conditions including mixtures, etc.

The reaction may be carried out through a wide temperature range and the process is operable between 200° C. and 700° C. However, in order to ensure a relatively rapid reaction rate, a temperature of at least 350° C. is preferred and temperatures above 550° C. are generally not preferred since their use may create some difficulties in the reaction, such as some decomposition of desired products. The preferred temperature range is, therefore, from 350° C. to 550° C.

The present invention may advantageously be practiced at atmospheric pressure. However, the pressure employed does not appear to be critical and higher or lower pressures have been employed without noticeable adverse effects.

The contact time employed does not appear to be highly critical, and contact times of from 1 second to almost 1 minute have been employed. In commercial practice, a contact time of from 1 to 10 seconds would probably be preferred; however, shorter or longer times may be employed if desired.

The following specific examples illustrate the practice of the present invention:

Example 1

Two hundred parts of n-butyl vinyl ether was pyrolyzed by dropping onto 200 parts of 4 mm. glass beads at 550 C. and a contact time of 39 seconds. The reaction products were condensed in a series of ice-cooled and Dry-Ice methanol cooled traps, and subjected to fractional distillation in an efficient still; hexadiene-1,3 and also butadiene-1,3 were identified therein.

Example 2

Two hundred parts of n-butyl vinyl ether was dropped onto 100 parts of activated aluminum oxide at 350–395° C. and a contact time of 15 seconds. The reaction products were condensed and distilled; both hexadiene-1,3 and butadiene-1,3 were identified therein.

In the above example, 10% tungstic oxide on alumina catalyst and a 9% molybdenum oxide on alumina catalyst were substituted for the activated aluminum oxide. The reaction and yields were the same in all cases.

When isopropenyl ethyl ether is substituted for the n-butyl vinyl ether in the above example, the following conjugated dienes can be identified in the reaction product: isoprene, pentadiene-1,3 and butadiene-1,3.

By substituting phenyl ethyl vinyl ether or the vinyl ether of phenyl methyl carbinol for n-butyl vinyl ether in the above example, a similar rearrangement takes place and a phenyl butadiene-1,3 can be identified in the reaction product.

When propyl-phenyl vinyl ether is subjected to the same reaction, 2-methyl-3-phenyl butadiene-1,3 can be identified in the reaction product, and when propyl vinyl α-phenyl vinyl ether is subjected to the same reaction, a phenyl butadiene-1,3 can be identified in the reaction product.

Example 3

Diisopropyl acetal, 1 mole, was passed over 50 parts of activated aluminum oxide at 380–464° C. and a contact time of 9.4 seconds. The reaction products were condensed and distilled. Isoprene and butadiene were identified therein.

We claim:

1. A process of producing conjugated diene hydrocarbons which comprises heating, in vapor phase and in the absence of added olefines, a compound selected from the group consisting of ethylenically unsaturated vinyl ethers of the type

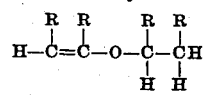

and compounds of the type

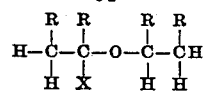

in which at least one of the R's stands for a member of the group consisting of alkyl, aryl and aralkyl radicals, and the remaining R's stand for a member of the group consisting of hydrogen, alkyl, aryl and aralkyl radicals, and X stands for a negative substituent which may readily be removed along with a hydrogen on the β-carbon atom, to a temperature of 350° C. to 550° C.

2. A process of producing conjugated diene hydrocarbons which comprises contacting, in vapor phase and in the absence of added olefines, a compound selected from the group consisting of ethylenically unsaturated vinyl ethers of the type

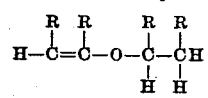

and compounds of the type

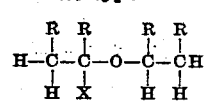

in which at least one of the R's stands for a member of the group consisting of alkyl, aryl and aralkyl radicals, and the remaining R's stand for a member of the group consisting of hydrogen, alkyl, aryl and aralkyl radicals, and X stands for a negative substituent which may readily be removed, along with hydrogen on the β-carbon atom, with an acid catalyst at a temperature of from 350° C. to 550° C.

3. A process of producing conjugated diene hydrocarbons which comprises contacting, in the vapor phase and in the absence of added olefines, an alkyl vinyl ether containing at least 3 carbon atoms in the alkyl group, with a dehydration catalyst at a temperature of from 350° C. to 550° C.

4. A process as defined in claim 3, wherein the said dehydration catalyst is an activated aluminum oxide dehydration catalyst.

5. A process of producing conjugated diene hydrocarbons, which comprises contacting, in the vapor phase and in the absence of added olefines, a dialkyl acetal containing at least 3 carbon atoms in said alkyl group, with a dehydration catalyst at a temperature of from 350° C. to 550° C.

6. A process of producing conjugated diene hydrocarbons, which comprises contacting, in vapor phase and in the absence of added olefines, a saturated α-halogen ether containing at least 5 carbon atoms, said ether having the formula

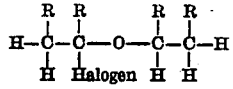

wherein at least one of the R's stands for a member of the group consisting of alkyl, aryl and aralkyl radicals and the remaining R's stand for a member of the group consisting of hydrogen, alkyl, aryl and aralkyl radicals, with a dehydration catalyst at a temperature of from 350° C. to 550° C.

JOHN W. COPENHAVER.
DONALD E. SARGENT.

REFERENCES CITED

The following references are of record in the file of this patent:

UNITED STATES PATENTS

| Number | Name | Date |
|---|---|---|
| 2,415,878 | Hale | Feb. 18, 1947 |

FOREIGN PATENTS

| Number | Country | Date |
|---|---|---|
| 379,674 | Great Britain | Aug. 30, 1932 |

OTHER REFERENCES

Egloff et al., The Oil and Gas Journal, Dec. 17, 1942, pages 36–37.

Egloff et al., Chem. Rev., vol. 36, 111–117 (1945).